United States Patent [19]

Huttlin

[11] Patent Number: 5,145,650

[45] Date of Patent: Sep. 8, 1992

[54] FLUIDIZED BED APPARATUS FOR MAKING AND/OR PROCESSING POURABLE MATERIAL

[76] Inventor: Herbert Huttlin, Daimlerstrasse 7, 7853 Steinen, Fed. Rep. of Germany

[21] Appl. No.: 611,987

[22] Filed: Nov. 8, 1990

[30] Foreign Application Priority Data

Jan. 10, 1990 [DE] Fed. Rep. of Germany ....... 4000572

[51] Int. Cl.$^5$ .......................... B01J 8/18; F27B 15/08; F26B 17/00; B05D 7/00
[52] U.S. Cl. .................................. 422/143; 422/144; 422/145; 422/139; 34/57 A; 427/213
[58] Field of Search ............... 422/143, 144, 145, 141; 34/57 A; 110/245; 122/4 D; 118/6 C, DIG. 5; 427/182, 185, 213

[56] References Cited

U.S. PATENT DOCUMENTS

| | | | |
|---|---|---|---|
| 3,214,844 | 11/1965 | Oates et al. ................. | 34/10 |
| 4,115,929 | 9/1978 | Staub et al. ................. | 34/10 |
| 4,219,589 | 5/1978 | Nike et al. .................. | 427/213 |
| 4,237,814 | 12/1980 | Ormós et al. ................ | 118/24 |
| 4,389,978 | 6/1983 | Northcote .................... | 122/4 D |
| 4,442,888 | 4/1984 | Kuwata ....................... | 165/104.16 |
| 4,970,804 | 10/1989 | Huttlin ...................... | 34/57 A |
| 5,033,205 | 7/1991 | Dodson ....................... | 34/10 |

FOREIGN PATENT DOCUMENTS

2825039 12/1978 Fed. Rep. of Germany.
3027517 2/1982 Fed. Rep. of Germany.

*Primary Examiner*—Robert J. Warden
*Assistant Examiner*—Christopher Y. Kim
*Attorney, Agent, or Firm*—Brumbaugh, Graves, Donohue & Raymond

[57] ABSTRACT

In a treatment chamber (12) having a gas inlet (16) and gas outlet (18) to produce a general flow of gas (E) directed from the bottom to the top a hollow lance (40) extends transversely of the general flow of gas (E) between two pairs of guide vanes (42,44). The outline of the lance (40) is symmetrical with respect to a vertical center plane (A), and it includes a conveyor channel (60) which extends in longitudinal direction of the lance and to which discharge nozzles (80) for material are connected. A pair of semishells (52) are arranged above the guide vanes (42,44) and, together with the guide vanes (42,44), they form a straight trough (53) which is at least approximately symmetrical with respect to the center plane (A). A pressure gradient can be produced between the gas inlet (16) and the gas outlet (18) at which gradient a rectilinear fluidized bed (F) is formed within the trough (53).

18 Claims, 8 Drawing Sheets

FLUIDIZED BED APPARATUS FOR MAKING AND/OR PROCESSING POURABLE MATERIAL

The invention relates to a fluidized bed apparatus for making and/or processing pourable material consisting of solid molded parts, comprising at least one treatment chamber which includes at least one gas inlet and at least one gas outlet to produce a general flow of gas, at least one hollow lance extending transversely of the general flow of gas in the treatment chamber, having an outline which is symmetrical with respect to a center plane, and including a conveyor channel which extends in longitudinal direction of the lance and to which discharge nozzles for material are connected, and at least one pair of guide vanes between which the lance is arranged for the general flow of gas to flow around it from the bottom to the top.

In the case of a fluidized bed apparatus of this kind known from DE 38 39 723 C1 the treatment chamber is the circular inner space of a vessel which is rotationally symmetrical with respect to a vertical axis. In the treatment chamber there is a ring of guide vanes which overlap one another, as seen in the direction of the axis of the vessel, to give a twist or spin to the upwardly directed flow of gas. Lances disposed radially with respect to the axis of the vessel are arranged between the guide vanes. They each include a plurality of discharge nozzles to deliver material which are located in the direction of flow of the gas. Great quantities of pulverous and/or liquid material can be supplied through these nozzles per unit time into a fluidized bed which forms above the guide vanes.

Granular material which has been produced and/or processed in this known fluidized bed apparatus is characterized by exceptionally good homogeneity. For instance, in making nucleating granules, a narrow particle size spectrum can be achieved and, in coating, the layers of coat obtained are of particularly uniform thickness.

Such uniformness, however, is not always desirable. To fill capsules for pharmaceutical application, for example, sometimes pellets are needed that have coats of different compositions or different thicknesses in order that certain active substances may be released specifically in certain areas of the human gastrointestinal tract. Up to now, such different pellets had to be produced in batches one after the other in the known apparatus, and longer shutdown periods could not be avoided to adapt the machinery to different operating conditions. At a given container size, the batch quantity of the known apparatus can be varied within relatively narrow limits only so that production by means of such fluidized bed apparatus cannot readily be changed to conform to different operational requirements.

It is, therefore, the object of the invention to devise a fluidized bed apparatus for producing and/or processing pourable material consisting of solid molded parts so that the apparatus is easily adaptable to different requirements of the kind mentioned.

Starting from a fluidized bed apparatus of the kind described initially, the object is met, in accordance with the invention, in that the center plane of the lance is located at least approximately vertically, a pair of semishells are disposed above the guide vanes forming, together with the guide vanes, a straight trough which is at least approximately symmetrical with respect to the center plane, and a pressure gradient can be produced between the gas inlet and the gas outlet, at which gradient a rectilinear fluidized bed is formed within the trough.

A trough according to the invention of a given overall length can constitute a single rectilinear treatment path in a corresponding elongated housing, or it may be subdivided into a plurality of sections which can be arranged in space-saving manner side by side in a common housing. In any case, similar or different steps of treatment may be performed at the same time in more or less long sections of the trough, as may be required, while unused sections are shutdown, for example by the provision of partitions. It is likewise possible to set out with different starting materials, such as pellets, crystals, tablets, or granular material of different composition and/or size supplied to different sections of the trough which, for instance, may be positioned side by side so as to obtain a final product in the end which will have a certain mixture of different particles.

Advantageous further developments of the invention may be taken from the subclaims.

BRIEF DESCRIPTION OF THE DRAWINGS

Embodiments of fluidized bed apparatus according to the invention will be described further below with reference to the accompanying diagrammatic drawings, in which.

The fluidized bed apparatus illustrated in FIGS. 1 to 4 comprises a housing 10 which presents a parallelepiped of elongated configuration in horizontal direction and has thermally insulated walls. Six treatment chambers 12 are formed inside the housing 10, having a common bottom 14, two gas inlets 16 each located in the bottom, and gas outlets 18 of which five each are associated with two adjacent treatment chambers 12.

Through the gas inlets 16, the treatment chambers 12 communicate with a common air supply chamber 20 disposed under the bottom 14 and receiving dehumidified hot air or another gas for treatment through connections 22. The gas outlets 18 open into spent air chambers 24 arranged at the longitudinal sides of the housing 10 and extending down to below the bottom 14 where they are adapted to be connected to the suction end of a conventional blower through connections 26. In operation, each treatment chamber 12 is closed at the top by a lid 28 made, for example, of glass and adapted to be swung open for cleaning purposes.

A conveyor belt 30 permeable to gas, such as a known articulated or jointed band of metal or plastics wire helices, lies on the bottom 14 and extends in longitudinal direction through the entire housing 10. The conveyor belt 30 may be withdrawn from a pay-off reel 32 and wound up, after use, on a take-up reel 34. Instead of these two reels 32 and 34, deflecting pulleys may be provided around which an endless conveyor belt is passed. The face ends at which the conveyor belt 30 enters into and leaves the housing 10 normally are closed by a flap 36 each.

Figure 1:
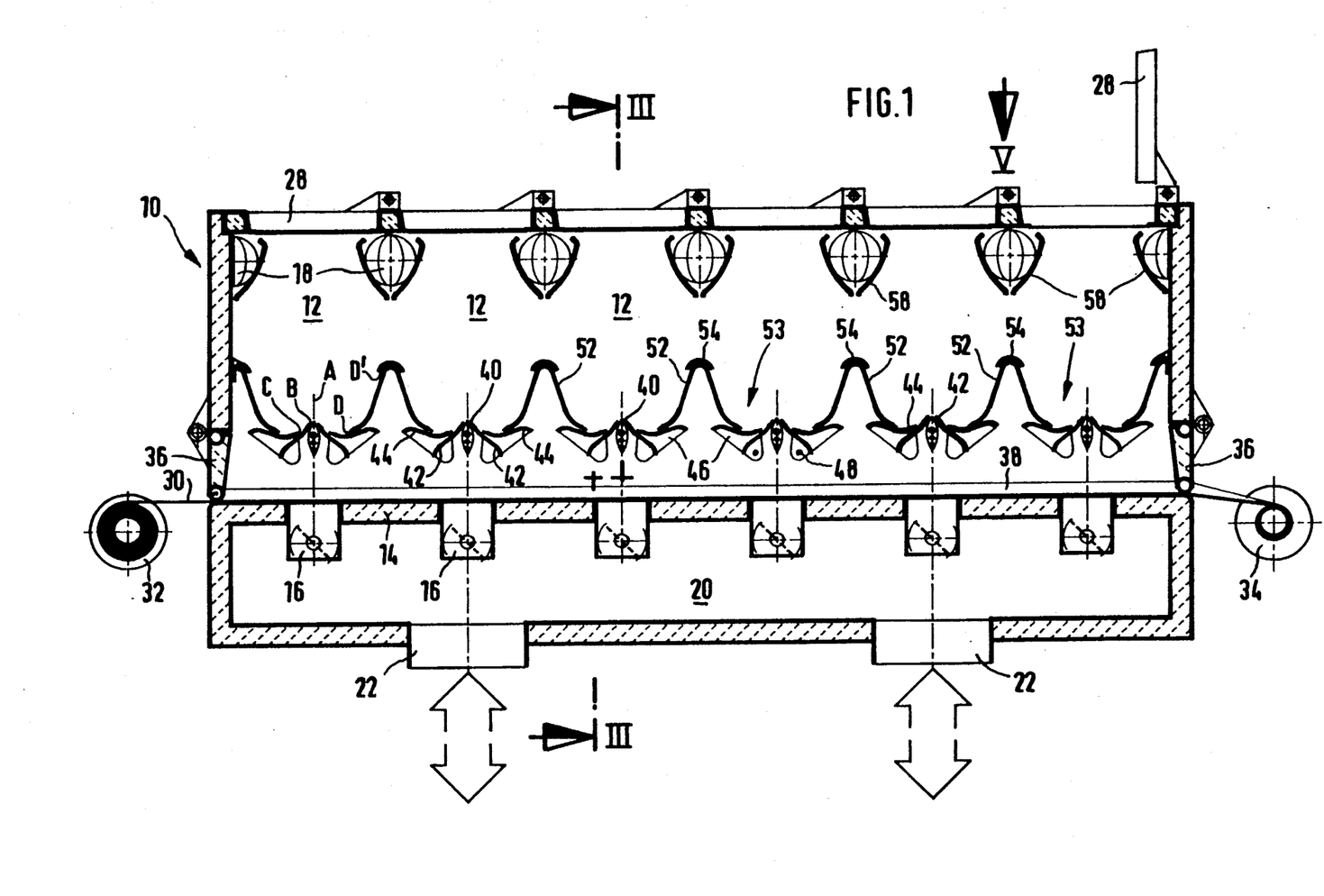
FIG. 1 is a front elevational view of a fluidized bed apparatus comprising sequential treatment chambers for coating and drying prefabricated molded parts in accordance with my invention.

To empty the treatment chambers 12, it is provided to place a foil 38 on a section of the conveyor belt 30 which is somewhat longer than the housing 10. By moving the conveyor belt 30, this foil subsequently is brought into the housing 10, loaded with material made or processed in the treatment chambers 12, and then moved out of the housing 10 together with that material by renewed movement of the conveyor belt 30. As indicated in FIG. 1, the foil 38 is drawn upwardly to such an extent at the lateral limits of the treatment chambers 12 that any contamination of the conveyor belt 30 by the composition being produced and/or treated is avoided.

All the built-in structures which will be described below are symmetrical with respect to a vertical center plane A of the respective treatment chamber 12, which plane extends transversely of the longitudinal direction of the housing 10. A lance 40 passes horizontally and spaced above the bottom 14 through each treatment chamber 12 in the center plane A. The outline of each lance 40 is of drop shape, symmetrical with respect to the center plane A, being rounded at the bottom and pointed at the top. At both sides of this contour there are two guide vanes 42 and 44 each, disposed in parallel with the corresponding lance 40.

The two guide vanes 42 and 44 at one and the other side of the lance 40 are interconnected by plates 46, each extending in a vertical longitudinal plane and fastened on a shaft 48 which extends parallel to the lance 40. The shafts 48 are connected to a pivot drive means 50 each, for example an hydraulic or pneumatic rotary wing motor by means of which the associated guide vanes 42 and 44 are pivotable back and forth through an angular range of 30°, for instance.

A semishell 52 each is arranged at either side of the lance 40, likewise extending parallel to the same. Together with the corresponding guide vanes 42 and 44 and the lance 40, the semishells 52 form a trough 53 which is almost totally closed at the bottom when the guide vanes are in their operating position —cf. second and third treatment chambers 12 from the right in FIG. 2—but leaves open three gaps B, C, and D at either side of the lance 40. These gaps extend throughout the width of the treatment chamber 12. Air used in the treatment, in the form a general flow of gas E (cf. FIGS. 2 and 3) may flow through these gaps B, C, and D, starting from the corresponding gas inlets 16 and flowing around the lance 40 in upward direction, forming a fluidized bed F which is defined by the trough 53 (cf. second chamber from the right in FIG. 2 and FIG. 3).

Figure 2:
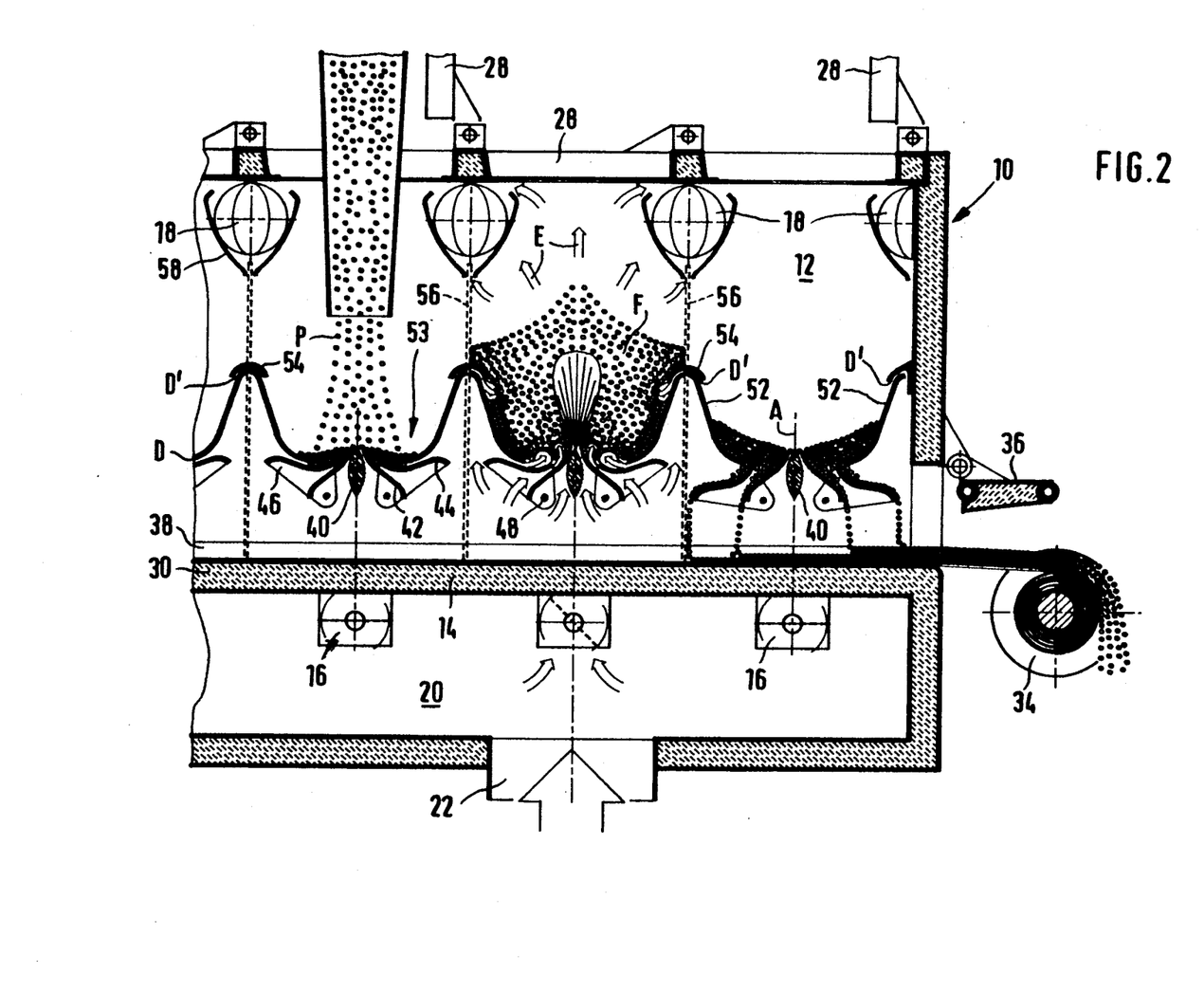
FIG. 2 is an exploded view of the treatment chambers in FIG. 1 at various stages of operation such as introduction of prefabricated molded material, formation of a fluidized bed, and removal of treated material.
Figure 3:
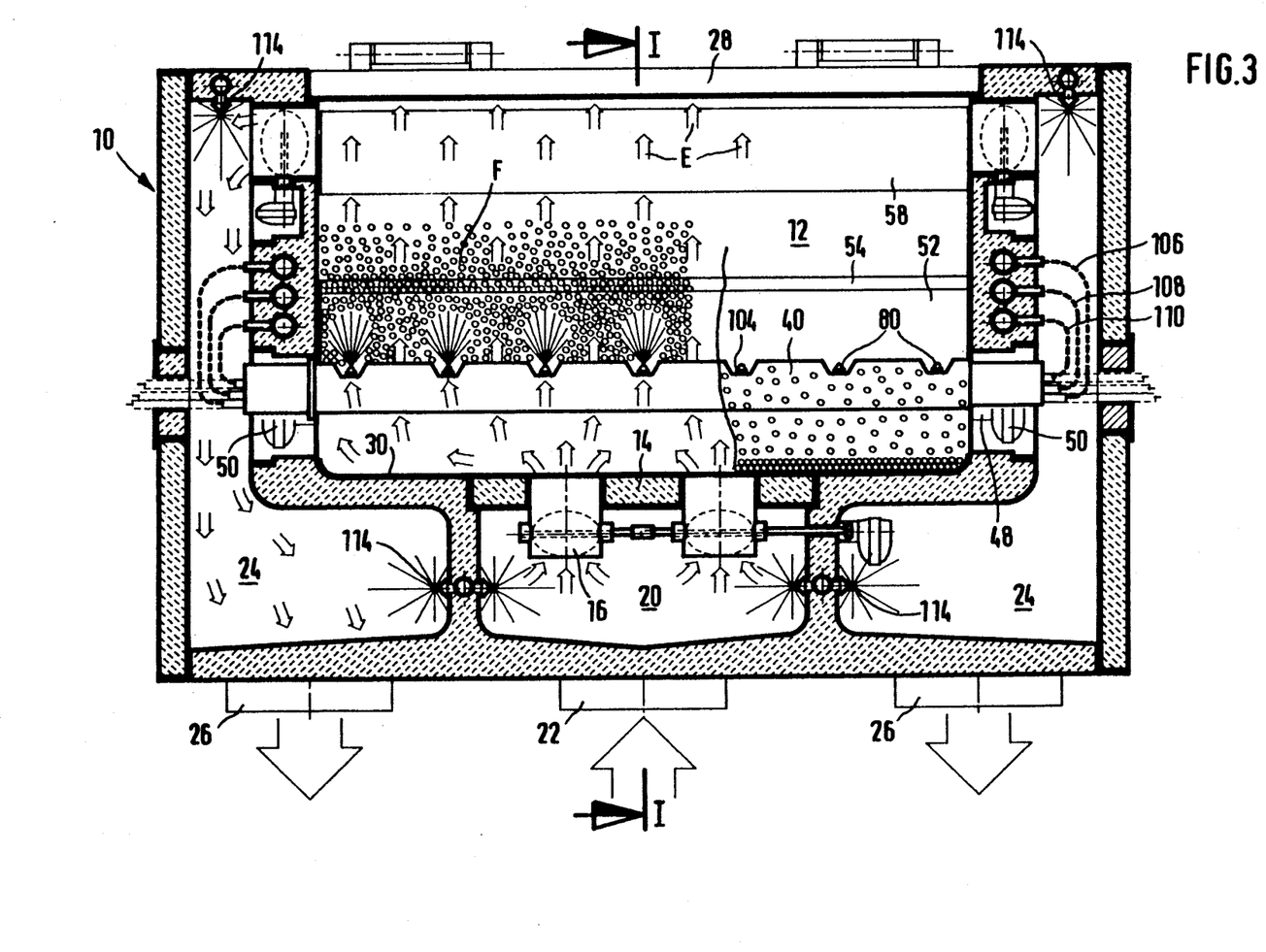
FIG. 3 is a cross-sectional view taken along line III—III of FIG. 1.
Figure 4:
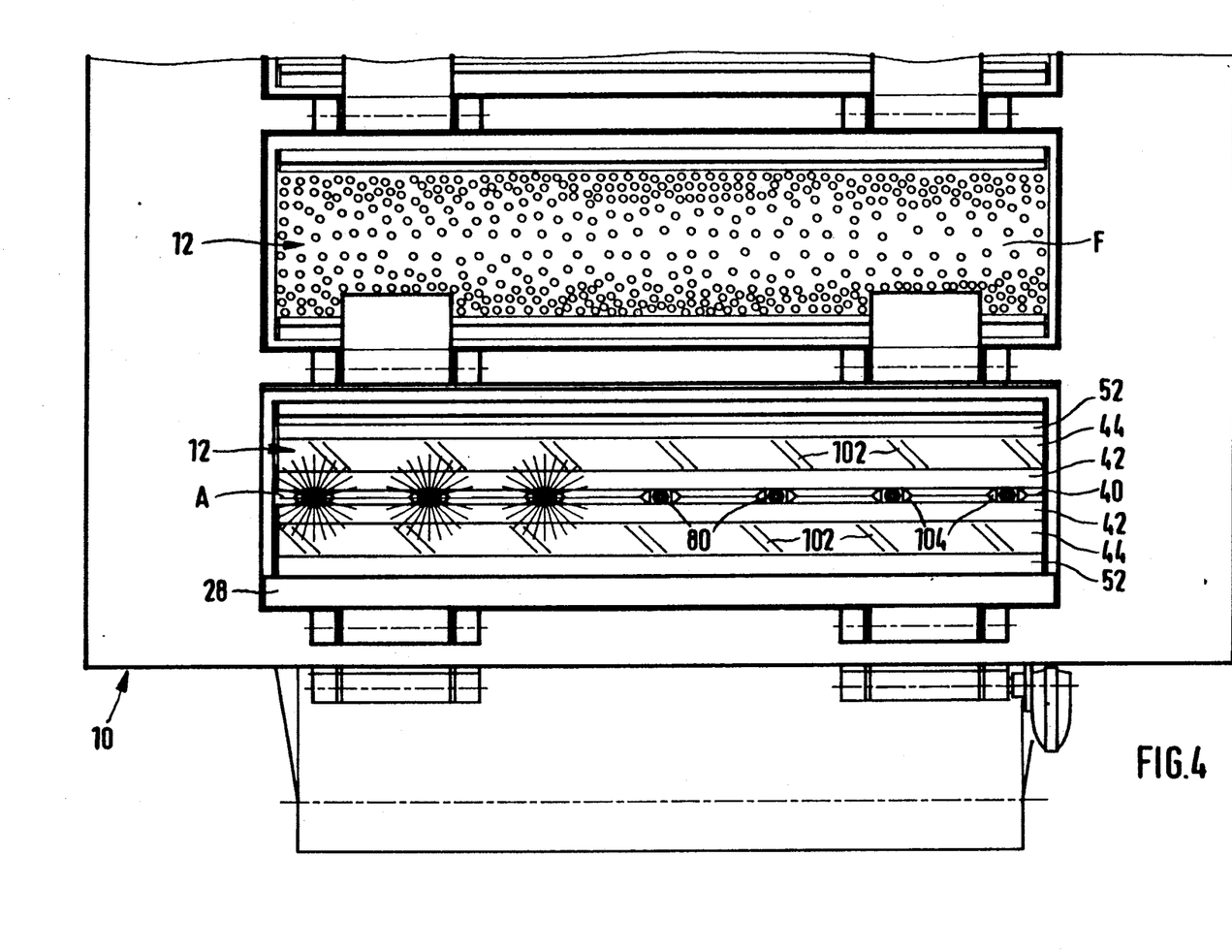
FIG. 4 is a top plan view of FIG. 1.

The guide vanes 42 and 44 can be pivoted by the pivot drive means 50 from their operating position into an emptying position —cf. first chamber from the right in FIG. 2. In this position, the material which has accumulated in the trough 53 after shutdown of the air flow may trickle down through the gaps B, C, and D on to the foil 38.

An intermediate space is left free between the upper edges of the semishells 52 in adjacent treatment chambers 12, and this space is covered by a roof element or shaped cover 54 which is concave when looked at from below. Between the upper edge of each semishell 52 and the corresponding shaped cover 54 a gap D' is left open through which another part of the general flow of gas E flows from top to bottom into the respective trough 53. The shaped covers 54 are mounted in such a way that material may flow across them if it exceeds a certain level in one of the troughs 53. As an alternative, adjacent troughs 53 may be separated by a partition 56. The gas outlets 18 located at a higher level are covered by baffle plates 58 so that dustlike particles, at best, of the composition will get into the spent air chambers 24 where they can be separated in known manner from the gas stream by filtering.

In all its treatment chambers 12, the apparatus shown in FIGS. 1 to 4, is fit for fluidized bed coating and drying of prefabricated molded parts P, such as pellets or tablets which are poured from above into each individual trough 53. With the apparatus according to FIGS. 5 to 9, on the other hand, it is possible first to extrude particles of a doughy mass, and then coat and finally dry them. Consequently, as the field of use of the apparatus illustrated in FIGS. 5 to 9, begins at an earlier stage of the manufacturing process, details of this apparatus will be described below before dealing with further common features of both apparatus.

Figure 5:
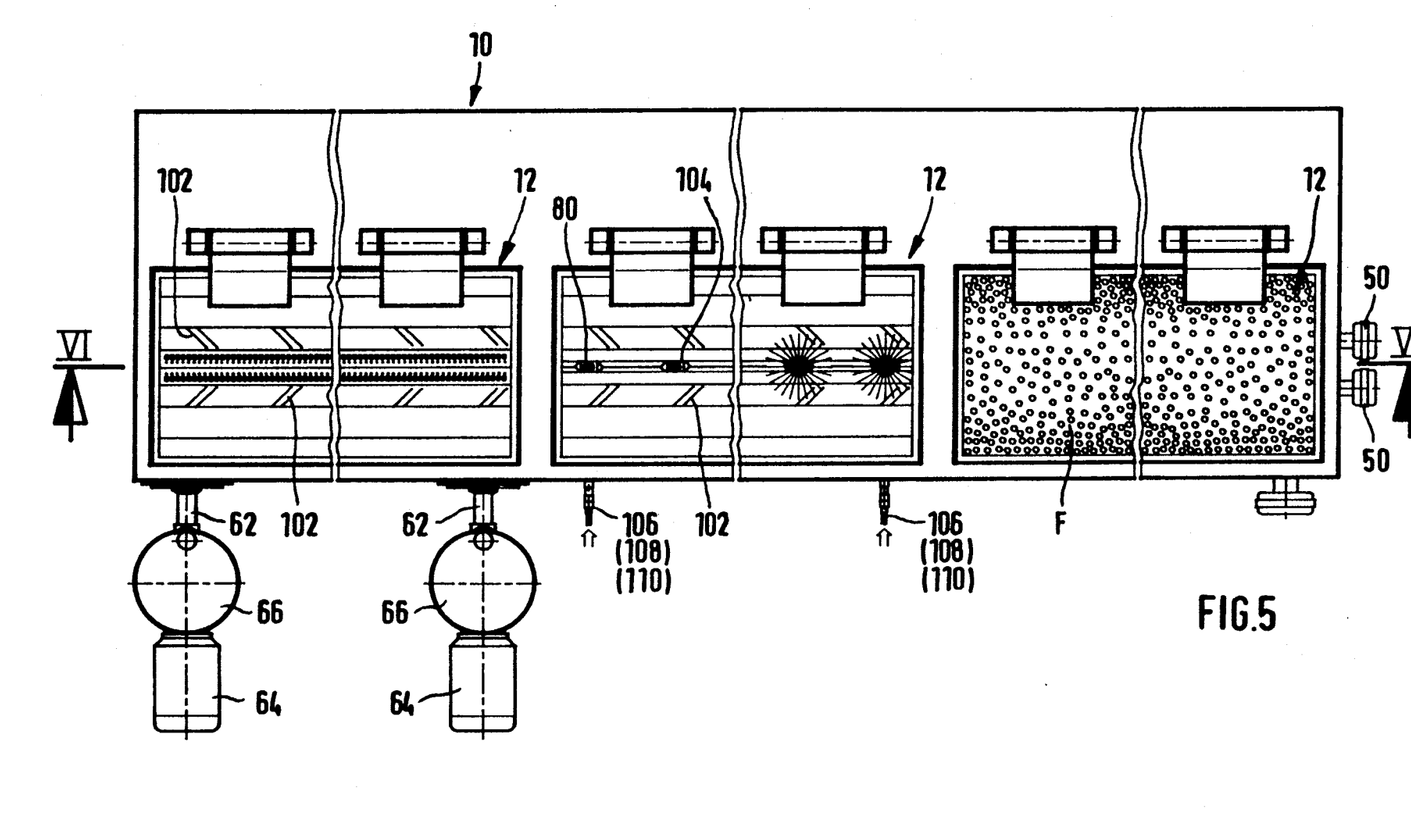
FIG. 5 is a top plan view of a fluidized bed apparatus comprising treatment chambers which are arranged behind each other.
Figure 6:
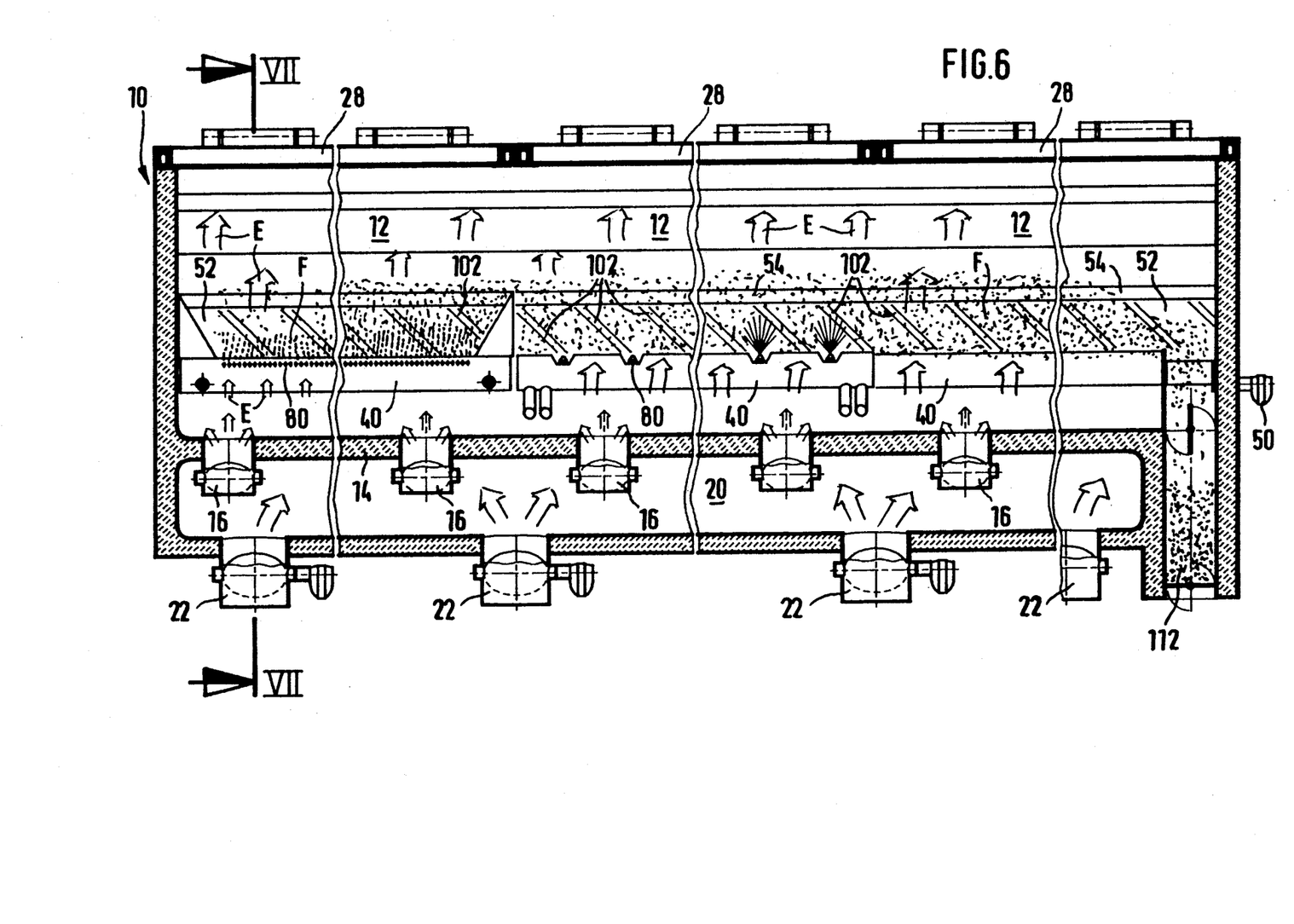
FIG. 6 is a cross-sectional view taken along line VI—VI of FIG. 5.
Figure 7:
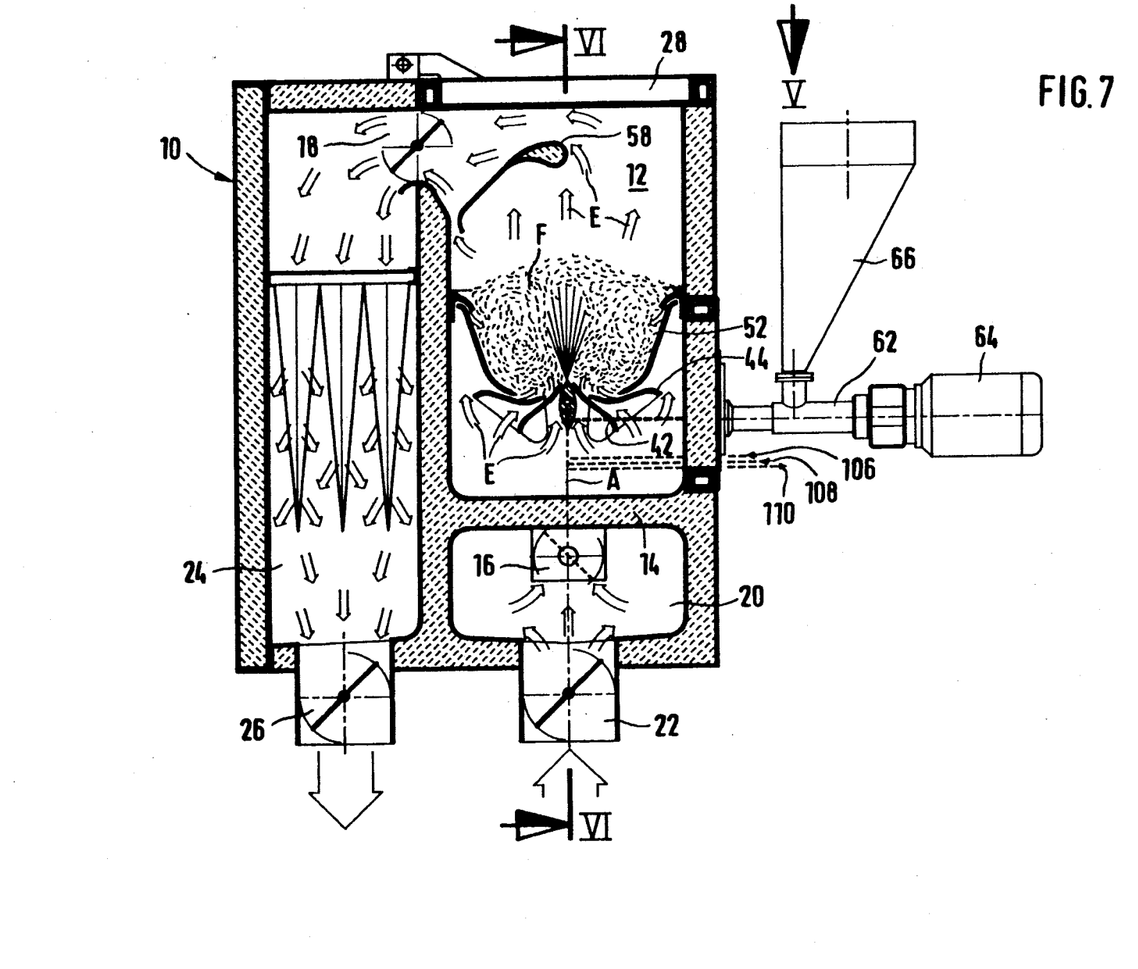
FIG. 7 is a cross-sectional view taken along line VII—VII of FIG. 6.

As shown in FIGS. 5 to 7, three elongated treatment chambers 12 corresponding to those illustrated in FIGS. 1 to 4 are arranged one behind the other in the housing 10. The left one in FIGS. 5 and 6 of these three treatment chambers 12 serves for extruding, the central one for coating, and the right one for drying. A single lance 40 subdivided into three aligned sections, one for each treatment chamber 12, extends through the three treatment chambers 12. Throughout their lengths all the portions of the lance 40 have the outer contour shown in FIG. 7, whereas only the part in the left treatment chamber 12 has all the design details illustrated in FIG. 8 and 9 and described below.

The portion of the lance 40 in the first treatment chamber 12, the left one in FIGS. 5 and 6, includes a conveyor channel 60 of circular cross section oriented in longitudinal direction and being disposed coaxially with the lower part of the lance profile likewise of circular arc shape, extending approximately for the full length of the first treatment chamber 12. A pump 62 each is connected laterally to the ends of the conveyor channel 60. This may be a conventional eccentric worm type pump driven by an electric motor 64 and pressing a doughy mass for extrusion from a receptacle 66 into the conveyor channel 60. The section of the lance 40 located in the first treatment chamber 12 includes an agitator 68 in its conveyor channel 60 which agitator is adapted to be driven by its own electric motor 69 and makes sure that the composition inside the conveyor channel 60 is stirred constantly and does not solidify.

Figure 8:
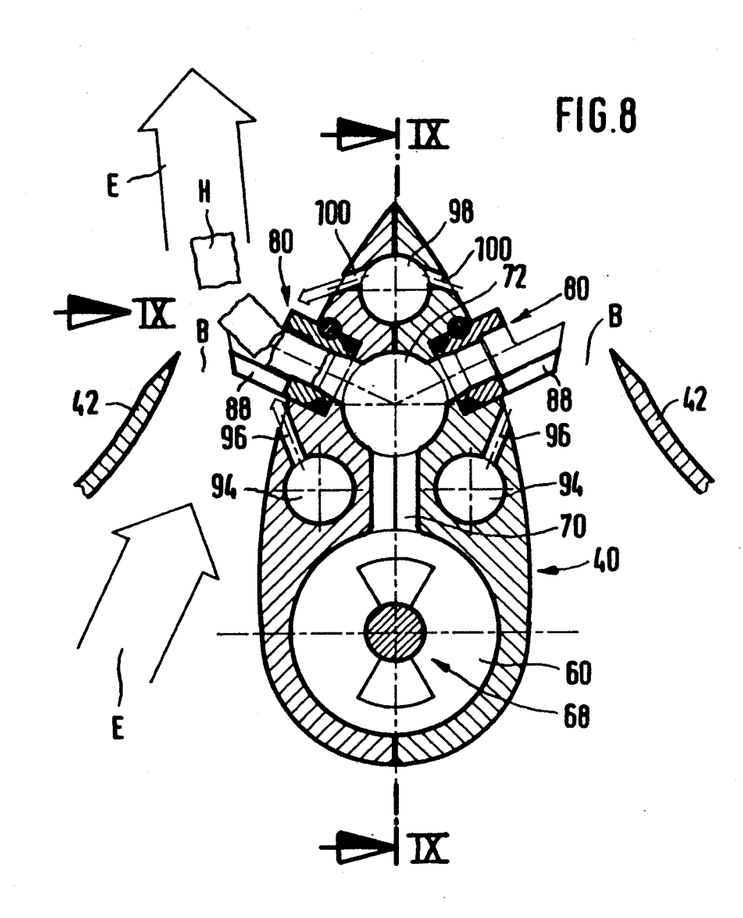
FIG. 8 is an exploded view of a lance in accordance with my invention.
Figure 9:
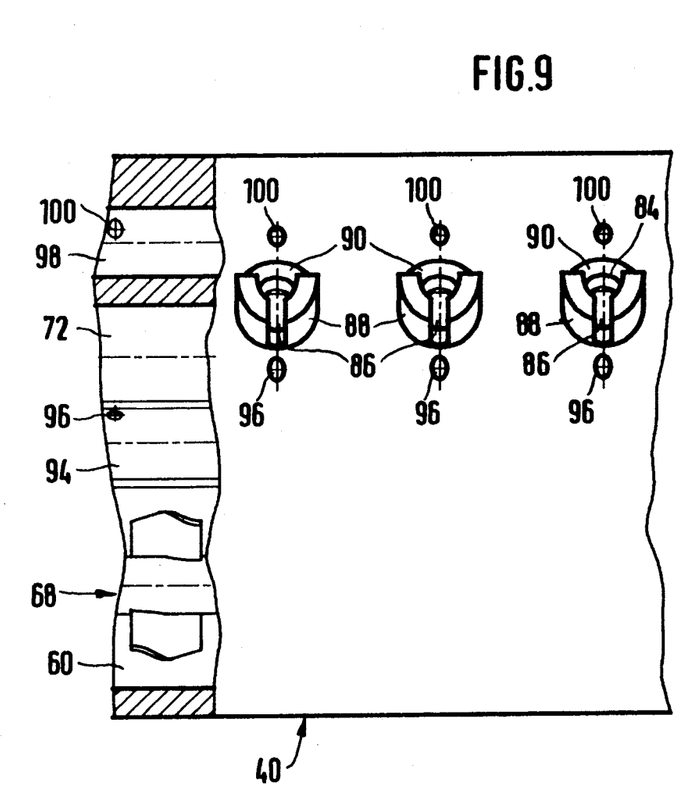
FIG. 9 is a cross-sectional view taken along line IX—IX of FIG. 8.

As shown in FIGS. 8 and 9, the conveyor channel 60 communicates through a longitudinal slot 70 with a distributor channel 72 which likewise extends in longitudinal direction of the lance 40 and from which equally spaced bores pass in oblique upward direction to the surface of the lance 40. The bores each have a shoulder where they are widened outwardly and where a sealing ring is seated. A discharge nozzle 80 for material, embodied by an extruder nozzle, is pushed into the enlarged outer region of each of the bores up to the shoulder.

Each of the discharge nozzles 80 for material located in the first treatment chamber 12 and shown in FIGS. 8 and 9 has an axially inner narrower portion which determines the cross section of a strand of the doughy mass produced in the discharge nozzle 80 for material, and an axially outer enlarged portion 84 adapted to be vented from outside through at least one breakthrough 86 to promote the drying of the strand. According to FIGS. 8 and 9, the breakthrough 86 is provided in the form of an axial slot positioned at the windward side of the discharge nozzle 80 for material, with respect to the general flow of gas E, and extends from the beginning of the enlarged portion 84 up to the free end of the discharge nozzle 80 for material.

In the case of all the discharge nozzles 80 for material located in the first treatment chamber 12, their half lying at the leeward side with respect to the general flow of gas E in the axially outer part of the widened portion 84 is removed, such as by milling, so that a semitubular shield 88 is what remains at the windward side, while a breakaway edge 90 is formed at the leeward side. In the lance 40 extending in the first treatment chamber 12 there are two tie bolts, according to FIG. 8, each extending at one side of the center plane A in longitudinal direction of the lance 40 and serving to lock the discharge nozzle 80 for material pressed into the respective half of the lance 40 against axial displacement and rotation.

The portion of the lance 40 in the first treatment chamber 12 further comprises two lower pressure gas ducts 94 which extend parallel to the conveyor channel 60 and from which pressure gas nozzles 96 lead away such that per breakthrough 86 of each discharge nozzle 80 for material there is one pressure gas nozzle 96 directed towards it. The pressure gas ducts 94 are fed intermittently by way of electromagnetic valves of known design with compressed air which may be dried and preheated. The lower pressure gas nozzles 96 thus emit pressurized air in pulses toward the opening range of the associated discharge nozzle 80 for material. In a sharply focussed jet, the pressurized air acts pulsatingly on the strand through the or a breakthrough in the respective discharge nozzle 80 for material, whereby an extruded particle H breaks off from the strand at each blast of air.

Another pressure gas duct 98, likewise in parallel with the conveyor channel 60, is arranged in the upper area of the lance 40 portion located in the first treatment chamber 12. It is fed continuously with hot, dry pressurized air. Pressure gas nozzles 100 depart from the upper pressure gas duct 98 which are each directed from above at an acute angle against the opening range of a discharge nozzle 80 for material. The extruded particle H forming in the same thus is dried by a hot air jet whose pressure prevents it from breaking off too soon, before its free end has reached the end of the shield 88.

When severed, the extruded particles H are entrained in upward direction by the general flow of gas E in the first treatment chamber 12. At the same time, a fluidized bed F or whirling bed is formed within the trough 53 defined by the semishells 52 and the guide vanes 42 and 44 and in it the extruded particles H are dried still further. This fluidized bed F advances slowly but steadily along both sides of the lance 40, to the right in FIGS. 5 and 6, since the partial streams of the general flow of gas E passing through the gaps B, C, and D have a forwardly directed flow component. This flow component is caused by the fact that the guide vanes 42 and 44 and the semishells 52 are formed with upwardly protruding corrugations or fins 102 rising to the left at both sides of the lance 40 and, therefore, presenting a herringbone pattern with the point directed to the right in the top plan view of FIG. 5.

In the central treatment chamber 12 of the apparatus illustrated in FIGS. 5 to 9 the guide vanes 42 and 44 and the semishells 52 have the same configuration and the same herring-bone pattern as in the first treatment chamber 12. The portion of the lance 40 passing through the central treatment chamber 12 is designed merely for spraying on the extruded particles H and, therefore, equipped with discharge nozzles 80 for multisubstance discharge. These discharge nozzles 80 for material each are disposed in a respective depression 104 at the upper edge of the lance contour and are directed vertically upwardly in the center plane A. The corresponding central portion of the lance 40 is connected to a liquid conduit 106, a moist air conduit 108, and a dry air conduit 110. The discharge nozzles 80 for material supplied by these conduits issue a mist of a coating substance, e.g. of an aqueous or organic solution, suspension, or dispersion, whereby the extruded particles H proceeding steadily forwards in the fluidized bed F become coated. Suitable multisubstance nozzles are known from DE 38 06 537 A1, especially FIGS. 5 to 7.

In the third treatment chamber 12, the right one in FIGS. 5 and 6, the coated extruded particles H merely are dried while they continue to move on steadily. The fluidized bed F produced by the general flow of gas E in the trough 53 may be sufficient to effect the drying. However, also in the third treatment chamber 12 the lance 40 may comprise nozzles through which, for instance, additional hot air is introduced into the fluidized bed F to promote the drying. At the end of the third treatment chamber 12 the coated, dried extruded particles H will drop into a chute 112.

When the lids 28 are swung open, the treatment chambers 12 offer ready access for cleaning. Nozzles 114 are provided both in the air supply chambers 20 and in the spent air chambers 24 for cleaning liquid to be sprayed in. This is true of both apparatus shown.

The apparatus according to FIGS. 1 to 4 operates in batches. The lances 40 in all the treatment chambers 12 are equipped substance nozzles of the kind known from DE 38 06 537 A1. According to FIG. 3 they each are connected at both ends, respectively, to a liquid conduit 106 and a moist air conduit 108 as well as a dry air conduit 110.

According to FIG. 4, the guide vanes 42 and 44 and/or the semishells 52 again are formed with oblique corrugations or fins 102 which, however, have the same inclination at both sides of the lance 40, when looked at from the top. Such fins 102 impart an oblique direction to the general flow of gas E so that the fluidized bed F at both sides of the lance 40 will travel in opposite directions along the lance, whereby the extruded particles H are mixed especially thoroughly.

What is claimed is:

1. A fluidized bed apparatus for making and/or processing pourable material of solid particles, comprising:

at least one treatment chamber (12) which has a gas inlet means (16) and a gas outlet means (18) said gas inlet means connected to blower means for generating in said treatment chamber (12) an upwardly directed general gas flow (E);

at least one hollow row member (40) extending horizontally in said treatment chamber (12), said rod member (40) having an external profile which is symmetrical with respect to a vertical center plane (A);

a longitudinal conveyor channel (60) formed in said rod member (40);

pump means (62) for supplying fluid material to said conveyor channel (60);

a plurality of discharge nozzles (80) for discharging a fluid material being arranged on said rod member (40) and connected to said conveyor channel (60);

at least one pair of elongated guide vanes (42, 44) extending through said treatment chamber (12) the said rod member (40), the rod member being arranged between the guide vanes (42, 44) such that said general gas flow (E) is directed upwardly around said rod profile; and a pair of elongated side wall members (52) in parallel with said guide vanes (42, 44) having an upper edge region and lower edge region, said lower edge region, disposed above said guide vanes such as to form, together with the guide vanes (42, 44), a straight elongated trough (53) which is substantially symmetrical with respect to said vertical center plane (A);

wherein said blower means produces, in said general gas flow (E) between said gas inlet (16) and said gas outlet (18), a fluidized bed (F) within said trough (53).

2. The fluidized bed apparatus according to claim 1, wherein a gap (D) is defined between each said side wall member (52) and an adjacent one of said guide vanes (44) for directing a portion of said general gas flow (E) across said discharge nozzles (80).

3. The fluidized bed apparatus according to claim 1, wherein at least one guide vane (42, 44) is arranged at either side of said hollow rod member (40) with a gap (C) being defined between such guide vanes thereby directing a portion of said general gas flow (E) across said discharge nozzles (80).

4. The fluidized bed apparatus according to claim 1, wherein each said side wall member (52) has an upper edge region which is separated from a roof element (54) by a gap (D') through which gap a portion of said general gas flow (E) is directed downwards along said wall member (52).

5. The fluidized bed apparatus according to any one of claims 1, 2, 3, or 4, wherein two or more treatment chambers (12), each containing a trough (53), are arranged side by side in a housing (10).

6. The fluidized bed apparatus according to claim 5, wherein the upper edge regions of said side wall members (52) have an arcuate shape such that excess material from one trough (53) flows across to the adjacent trough (53) of the next treatment chamber side by side.

7. The fluidized bed apparatus according to claim 6 wherein a side wall member within the next treatment chamber in side by side relationship is adjacent to a side wall member in the preceding treatment chamber, and said roof element extends over the upper edge regions of both said adjacent side wall members forming a gap (D') each with said adjacent side wall members through which a portion of said general gas flow (E) is directed downwards along each adjacent side wall member.

8. The fluidized bed apparatus according to claim 7 wherein a conveyor belt (30) below the troughs (53) extends through the treatment chambers (12) to permit removal of treated material from the housing (10).

9. The fluidized bed apparatus according to claim 8 wherein the guide vanes (42, 44) on either side of said hollow rod are formed from obliquely corrugated or fin shaped members, each guide vane separated at angle of 180 degrees from a guide vane on the opposite side of said hollow rod.

10. The fluidized bed apparatus according to any one of claims 1, 2, 3, or 4 wherein a plurality of treatment chambers (12) are aligned along an axis, said hollow rod member lying along said axis and extending through said treatment chambers.

11. The fluidized bed apparatus according to claim 10, wherein said hollow rod member (40) is furnished with different discharge nozzles (80) for different material in the various treatment chambers (12).

12. The fluidized bed apparatus according to claim 10 wherein the guide vanes (42, 44) on either side of said hollow rod are formed from obliquely corrugated or fin shaped members, each guide vane separated at an angle of 90 degrees from a guide vane on the opposite side of said hollow rod.

13. The fluidized bed apparatus according to claim 8 wherein the side wall members (52) are formed from obliquely corrugated or fin shaped members and are separated at an angle of 180 degrees.

14. The fluidized bed apparatus according to claim 9 wherein the side wall members (52) are formed from obliquely corrugated or fin shaped members and are separated at an angle of 180 degrees.

15. The fluidized bed apparatus according toc claim 10 wherein the side wall members (52) are formed from obliquely corrugated or fin shaped members and are separated at an angle of 90 degrees.

16. The fluidized bed apparatus according to claim 12 wherein the side wall members (52) are formed from obliquely corrugated or fin shaped members and are separated at an angle of 90 degrees.

17. A fluidized bed apparatus according to claim 1 wherein said guide vanes (42, 44) are interconnected by plates (46) each extending in a vertical longitudinal plane and fastened on a shaft (48), said shaft extending parallel to said hollow rod (40).

18. A fluidized bed apparatus according to claim 17 wherein said shaft (48) is connected to a pivot drive means (50) such that said guide vanes (42, 44) are pivotable through an angle of 30 degrees.

* * * * *

UNITED STATES PATENT AND TRADEMARK OFFICE
CERTIFICATE OF CORRECTION

PATENT NO. : 5,145,650

DATED : September 8, 1992

INVENTOR(S) : Herbert Hüttlin

It is certified that error appears in the above-indentified patent and that said Letters Patent is hereby corrected as shown below:

Col. 6, line 52, "equipped" should read --equipped with discharge nozzles 80 for material in the form of multi- --;

Col. 7, line 6, "row member" should read --rod member--;

Col. 7, line 20, "(12) the" should read --(12) parallel with the--;

Col. 8, line 2, "side by side" should read --in side by side relationship--; and Col. 8, line 45, "toc" should read --to--.

Signed and Sealed this

Twenty-first Day of June, 1994

Attest:

BRUCE LEHMAN

Attesting Officer     Commissioner of Patents and Trademarks